July 24, 1962 J. W. DENISON, JR 3,045,332

BONDING MEMBER

Filed Jan. 28, 1955

INVENTOR:
JAMES W. DENISON, JR.
BY [signature]
HIS ATTORNEY.

United States Patent Office 3,045,332

Patented July 24, 1962

3,045,332

BONDING MEMBER

James W. Denison, Jr., Owensboro, Ky., assignor to General Electric Company, a corporation of New York Filed Jan. 28, 1955, Ser. No. 484,780

5 Claims. (Cl. 29—182.5)

My invention relates to means for effecting bonds and pertains more particularly to new and improved means for effecting bonds through the agency of electrical heating.

In some arts such as that of electronic tube manufacture, it is generally customary to fabricate devices in parts or sections and then to bond or seal these parts together. Usually, gas burners are used to provide the heat necessary to effect the bonds. However, from the standpoints of efficiency, the degree of control possible and for various other reasons it is more desirable to employ electrical heating means instead of gas burners. Heretofore, electrical heating has been utilized in effecting bonds by assembling between members to be bonded a metallic member which when subjected to a sufficiently strong R.F. field would heat up causing the members to fuse and thereby provide a bond. However, often it is the case that the members to be joined are formed of materials having such expansion characteristics as to make it difficult to provide a metal bonding member that will satisfactorily match the members to be bonded. Accordingly, a primary object of my invention is to provide a new and improved means for effecting a bond by means of electrical heating.

Another object of my invention is to provide new and improved means for providing a bond which is adapted for satisfactorily bonding members of different expansion characteristics.

Another object of my invention is to provide new and improved bonding means adapted for affording satisfactory bonds between members of various and wide degrees of differences in coefficients of expansion.

Another object of my invention is to provide new and improved bonding means adapted to be formed in such a manner as to facilitate the handling thereof and to facilitate the adaption thereof to the bonding of members of various configurations.

Further objects and advantages of my invention will become apparent as the following description proceeds and the features of novelty which characterize my invention will be pointed out with particularity in the claims annexed to and forming part of this specification.

In carrying out the objects of my invention I provide an admixture of a vitreous bonding material and metal particles between the members to be bonded. Then I inductively heat the metal particles sufficiently to fuse the bonding material thereby to effect the bond. The admixture of bonding material and metal particles can be suitably bound and formed into bonding members to be disposed between members to be joined or it can be formed integral with one or more of the members to be joined. Additionally, the proportions of the ingredients of the admixture can be varied to provide an admixture of substantially any desired coefficient of expansion for matching the expansion characteristics of the members to be joined; and a plurality of layers of admixtures of progressively substantially different coefficients of expansion can be provided to facilitate bonding of members of substantially widely different coefficients of expansion.

For a better understanding of my invention reference may be had to the accompanying drawing in which.

Figure 1:
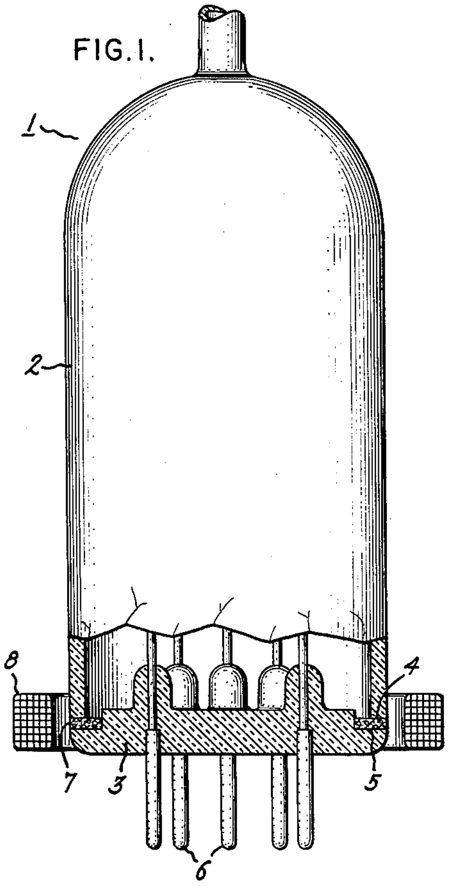
FIG. 1 is an enlarged side elevational view of an electronic tube partially sectionalized to illustrate my invention applied to the bonding of the bulb and stem portions thereof.

Referring to FIG. 1, I have shown my invention applied to the bonding of glass component parts of an electronic tube envelope 1. However, it is to be understood that my invention is not limited to the bonding or sealing of glass members of an electronic tube or other similar device, but is equally applicable to the bonding of all types of members of materials such as metal, ceramic, etc. and that the members joined may be of different materials such as glass and metal, ceramic and metal, etc.

The tube envelope 1 comprises a glass bottle or bulb portion 2 and a glass stem 3. The bottle 2 is adapted for being bonded or sealed at the edge 4 thereof to an edge portion 5 of the stem 3. The stem 3 is formed to include leads or pins 6 embedded in and extending through the glass portion thereof, in the manner shown, to provide for electrical connection to components of a tube cage (not shown) adapted for being sealed in the envelope 1.

In order to bond the edge 4 of the bottle to the edge 5 of the stem, I have provided a bonding member 7. To conform to the cross-sectional configuration of the envelope, the member 7 is shown formed as an annulus. However, it will be clear that in general, its configuration will depend solely upon the configurations of the members to be joined or bonded. In an operative embodiment, in sealing a standard miniature tube type, the member 7 was formed of a compressed admixture of a vitreous bonding material such as a glass frit of about −100 mesh, and a metal power of approximately −325 mesh. By way of example, the metal powder was composed of 1 percent copper, 10 percent molybdenum and 89 percent iron by weight. Also by way of example, the member 7 constituted approximately 80 percent metal powder plus 20 percent glass frit by weight.

The member 7 may be formed by placing the admixture of glass and metal powders in any suitable die or mold and thereafter administering suitable pressure to bind the materials together. Additionally, the member 7 may be sintered in a hydrogen atmosphere furnace at a sufficiently high temperature and for an adequate period, such as a temperature of approximately 700° C. for about 20 minutes, thereby to bind the materials together for further facilitating the handling and to reduce any reactions of the glass used with the atmosphere.

Alternatively, the frit and metal powder can be held together or bound to form the member 7 by means of paraffin or any similar binding material which can subsequently be burned out as by inductive or furnace heating of the metal particles or powder for thus leaving the member in a semi-sintered state.

Following formation of the bonding member 7 in either of the above-described manners, the member 7 is placed on the portion 5 of the tube stem 3 in the manner shown in FIG. 1 and the bottle 2 is placed over the tube cage (not shown) and in good contact with the member 7 in the manner also shown in FIG. 1. Thereafter, the assembly is placed in a radio frequency field as by being inserted in an energized induction coil designated 8. As seen in the drawing, the assembly is so disposed in the coil 8 as to subject the member 7 to the greatest possible effect thereof. Thus, the metal portion of the member 7, comprising the metal particles or powder, serves as an inductor in the radio frequency field for absorbing heat energy to melt the glass portion of the member 7, comprising the glass frit, and for transmitting heat to the edge 4 of the bottle 2 and the edge 5 of the stem 3. As a result the melted frit wets the edges to be bonded and fuses therewith to effect a strong adherent bond between the bottle and the stem thereby to form the assembly 1.

The strength of the joint or bond effected in the above-described manner is enhanced by a keying or locking mechanism at and below the surfaces of the member 7. That is, the metal particles or powder dispersed in the material comprising the bond become keyed to the material at the edges 4 and 5 of the bottle and stem, respectively, whereby the bond between these members is strengthened.

Figure 3:
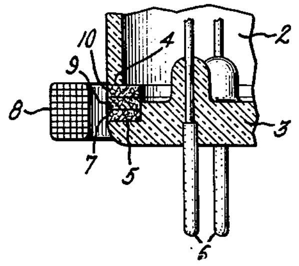
FIG. 3 is an enlarged fragmentary sectional view illustrating a modified form of my invention.

It is to be understood that my invention is not limited to the particular metal powders and percentages thereof referred to above, and can be made of any combination of metal powders that are compatible with each other and that when admixed with the glass frit will provide a bonding member having the coefficient of expansion desired. That is, in accordance with the coefficients of expansion of the members to be joined, such as the bottle 2 and the stem 3, the particular metal powders and percentages thereof employed in making up the member 7 may be selected to provide a member having a coefficient of expansion adapted for substantially matching those of both of the members to be sealed.

Where members of widely different coefficients of expansion are to be bonded a plurality of bonding members such as the member 7, each with a substantially different coefficient of expansion, may be employed in the manner shown in FIG. 3. That is, if members such as a tube bottle 2 and stem 3 which might have substantially widely different coefficients of expansion are to be bonded by my method, a first member 7 having a coefficient of expansion substantially the same as the stem 3 could be placed on the edge 5 of the stem in the manner shown. Thereafter, a member 9 formed in the same manner as the member 7 but of ingredients adapted for providing it with a coefficient of expansion substantially the same as the member 7 but somewhat closer to that of the bottle 2 may be placed on the member 7. If the coefficient of expansion of the member 9 does not substantially match that of the bottle 2, then still another member 10 formed of ingredients adapted for substantially matching the coefficients of expansion of the member 9 and the bottle 2 may be provided between the member 9 and the edge 4 of the bottle in the manner shown in FIG. 3. Thus, it will be seen that by providing a plurality of bonding members formed in accordance with my invention and to provide progressively different coefficients of expansion it is possible to provide a bonding structure adapted for effecting satisfactory seals between members of substantially widely different coefficients of expansion. As seen in FIG. 3 the assembly provided in the just-described manner may be subjected to a radio frequency field provided by an induction coil 8. Thus, the metal portions of the several bonding members made up of the metal particles or powders thereof are adapted for absorbing energy thereby to melt the glass frits of the various bonding members and to heat the edges of the members to be bonded; and, in the same manner as described above with regard to FIG. 1, a bond or seal is effected between the members 2 and 3.

It will be seen that while I have shown three bonding members 7, 9 and 10 provided for effecting a bond between members of substantially widely different coefficients of expansion, any number thereof may be employed and the number used will be controlled only by the extent of the difference of expansion characteristics of the members to be joined.

Figure 4:
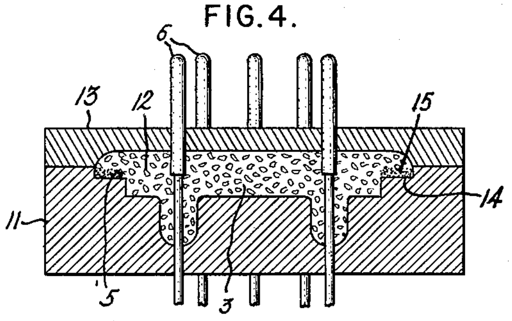
FIG. 4 is an enlarged sectional view illustrating a manner of forming a member to be bonded with an embodiment of my invention integrally incorporated therein.
Figure 5:
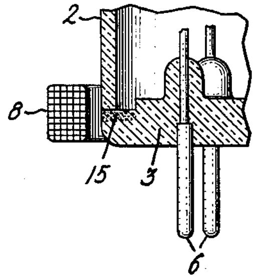
FIG. 5 is an enlarged fragmentary sectional view illustrating the manner in which a member formed in accordance with FIG. 4 is adapted for effecting a bond with another member.

As seen in FIG. 4, the layer of an admixture of a vitreous bonding material and metal particles adapted for effecting a bond by means of inductive heating need not be separately formed as a bonding member such as the annulus 7 and placed between the members to be bonded but may be formed integrally with one of these members. For instance, such a layer may be formed as part of the edge 5 of the stem 3 which consists of the steps of providing a suitable mold or die 11 adapted for being filled with powdered glass 12 and for holding in position the leads 6 to be embedded in the stem. Upon positioning of a suitable pressure plate 13 over the prong portions of the leads 6 and exertion of an adequate pressure thereon the powdered glass 12 is caused to be compressed into a single member comprising the stem 3. Now as seen in FIG. 4, this method readily lends itself to the formation of the bonding means integrally with the stem 3. This may be accomplished by placing an admixture of vitreous bonding material and metal powder such as that used in forming the member 7 on a shoulder 14 formed in the die 11 before all the powdered glass 12 is deposited in the die. Thus when the stem 3 is completely formed by operation of the die structure in the manner described above a bonding surface or structure designated 15 in FIGS. 4 and 5 is formed which is integral with the stem 3. With the bonding structure 15 integral with one of the members to be bonded the other member is simply placed into contact with the portion 15 in the manner shown in FIG. 5 and thereafter the assembly is disposed in a radio frequency field as by insertion into the induction coil 8. As in the above-described forms of my invention the metal particles in the bonding means 15 will absorb energy for heating up and thereby melting the glass frit included in the bonding means 15 and for transmitting heat to the edges of the members to be bonded thereby to effect a satisfactory and unusually strong bond.

Figure 6:
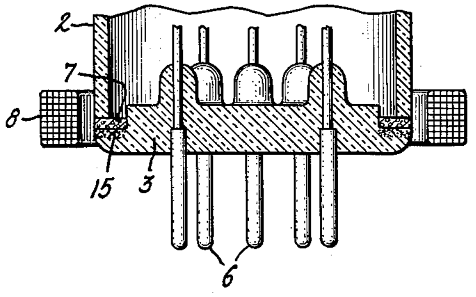
FIG. 6 is an enlarged fragmentary sectional view illustrating still another modified form of my invention.
Figure 2:
FIG. 2 is an enlarged perspective view of a bonding member made in accordance with the teachings of my invention.

Now with reference to FIG. 6, it will be seen that the just-described form of my invention including the bonding portion 15 formed integral with the stem 3 and comprising an admixture of vitreous bonding material and metal particles or powder may be employed in cooperation with a bonding member such as 7 to effect a bond between the bottle 2 and the stem 3. In this form of my invention the vitreous material included in the portion 15 of the stem and that of the member 7 may be fused for effecting a seal between the members to be joined and by means of the same method described above. Specifically, the member 7 may be placed on the stem 3 over the portion 15 and the bottle 2 may thereafter be placed in engagement with the member 7, and the whole assembly subsequently inserted into the energized induction coil 8. Upon sufficient subjection of the assembly to the effects of the coil, the metal particles or powder included in the portion 15 and the member 7 are caused to be inductively heated sufficiently for fusing the vitreous bonding material or glass frit included in the portion 15 and the member 7 and heating the edges of the members to be bonded for thereby effecting a satisfactory seal.

It will be seen that when desired, such as when the members to be joined are of substantially widely different expansion charactersitics, a plurality of bonding members of progressively different coefficients of expansion, such as those illustrated in FIG. 3, could be employed in combination with the integral bonding means 15 illustrated in FIGS. 5 and 6.

It is to be understood that while I have shown the members 7, 9 and 10 as being separately formed they could alternatively be formed as a single member. That is, various admixtures of vitreous bonding material and metal powders, each having a different coefficient of expansion, could be provided in the manner described above. Then, these admixtures could be spread in layers in a mold, with for example, the admixture of smallest coefficient at the bottom and ranging upwardly to that of the highest coefficient. Thereafter they could be pressed to form a single bonding member and sintered in the manner described above.

It will be seen that while I have referred to the vitreous bonding material merely as glass frit it can preferably comprise powdered glass of a low melting point so as to facilitate the fusion thereof by the heat inductively provided by the metal in cooperation with the energized induction coil 8.

While specific embodiments of my invention have been shown and described it will of course, be understood that various modifications may yet be devised by those skilled in the art which will embody the principles of the invention and found in the true spirit and scope thereof.

What I claim as new and desire to secure by Letters Patent of the United States is:

1. A bonding member adapted for being positioned between elements to be bonded and for being heated inductively to a bonding temperature comprising an annular sintered metallic matrix wholly formed of only a substantially uniform admixture of approximately 80 percent metal particles and 20 percent powdered glass by weight of the composition of the member.

2. A bonding material adapted for being heated inductively to provide a vitreous seal between members to be joined comprising a uniform admixture of approximately 20% glass frit and 80% metal powder by weight, and said metal powder being composed of approximately 1 percent copper, 10 percent molybdenum, and 89 percent iron by weight.

3. A bonding member adapted for being positioned between elements to be joined by a vitreous bond and for being heated inductively to a temperature for effecting the bond comprising an annular sintered metallic matrix wholly formed of compressed metal particles and glass frit with said glass frit uniformly dispersed between said metal particles throughout said matrix, said metal particles constituting approximately 80 percent by weight of said matrix, said metal particles being composed of approximately 1 percent copper, 10 percent molybdenum, and 89 percent iron by weight, and said glass frit constituting approximately 20 percent of said matrix for thereby providing a fluid glass surface on said matrix when said matrix is inductively heated to said temperature for effecting said bond.

4. A closure member for use in sealing an end of a glass envelope comprising a disc-like glass body including an integral annular rim portion on the surface of said body and for being engaged by the end of said envelope, only said integral annular rim portion of said body having metal particles uniformly distributed therein for being heated inductively to effect flowing of the glass portion of said body at said rim portion and heating of the end of an envelope engaging said rim portion, thereby to effect a vitreous seal between said closure member and envelope end, and said metal particles comprising approximately 80% by weight of the composition of said annular rim portion of said glass body.

5. A member comprising an annular portion adapted for being heated inductively to a bonding temperature for effecting a bond between said annular portion and another member, said annular portion comprising a compressed metallic matrix wholly formed of only a substantially uniform admixture of approximately 80% metal particles and 20% powdered glass by weight of the composition of said annular portion.

References Cited in the file of this patent

UNITED STATES PATENTS

| | | |
|---|---|---|
| 1,972,463 | Schlecht | Sept. 4, 1934 |
| 2,246,165 | Dawihl et al. | June 17, 1941 |
| 2,263,520 | Romp | Nov. 18, 1941 |
| 2,415,036 | Quinn | Jan. 28, 1947 |
| 2,556,059 | Braunsdorff | June 5, 1951 |
| 2,559,572 | Stalego | July 3, 1951 |
| 2,654,822 | Agule | Oct. 6, 1953 |
| 2,657,298 | Andrus | Oct. 27, 1953 |
| 2,664,618 | Kleis | Jan. 5, 1954 |
| 2,679,568 | Smith et al. | May 25, 1954 |
| 2,691,814 | Tait | Oct. 19, 1954 |
| 2,739,829 | Pedlow et al. | Mar. 27, 1956 |
| 2,771,969 | Brownlow | Nov. 27, 1956 |
| 2,817,046 | Weiss | Dec. 17, 1957 |